(No Model.)
A. SCHNIER & S. R. SMITH.
FEED MECHANISM FOR SAW MILL CARRIAGES.
No. 377,469. Patented Feb. 7, 1888.
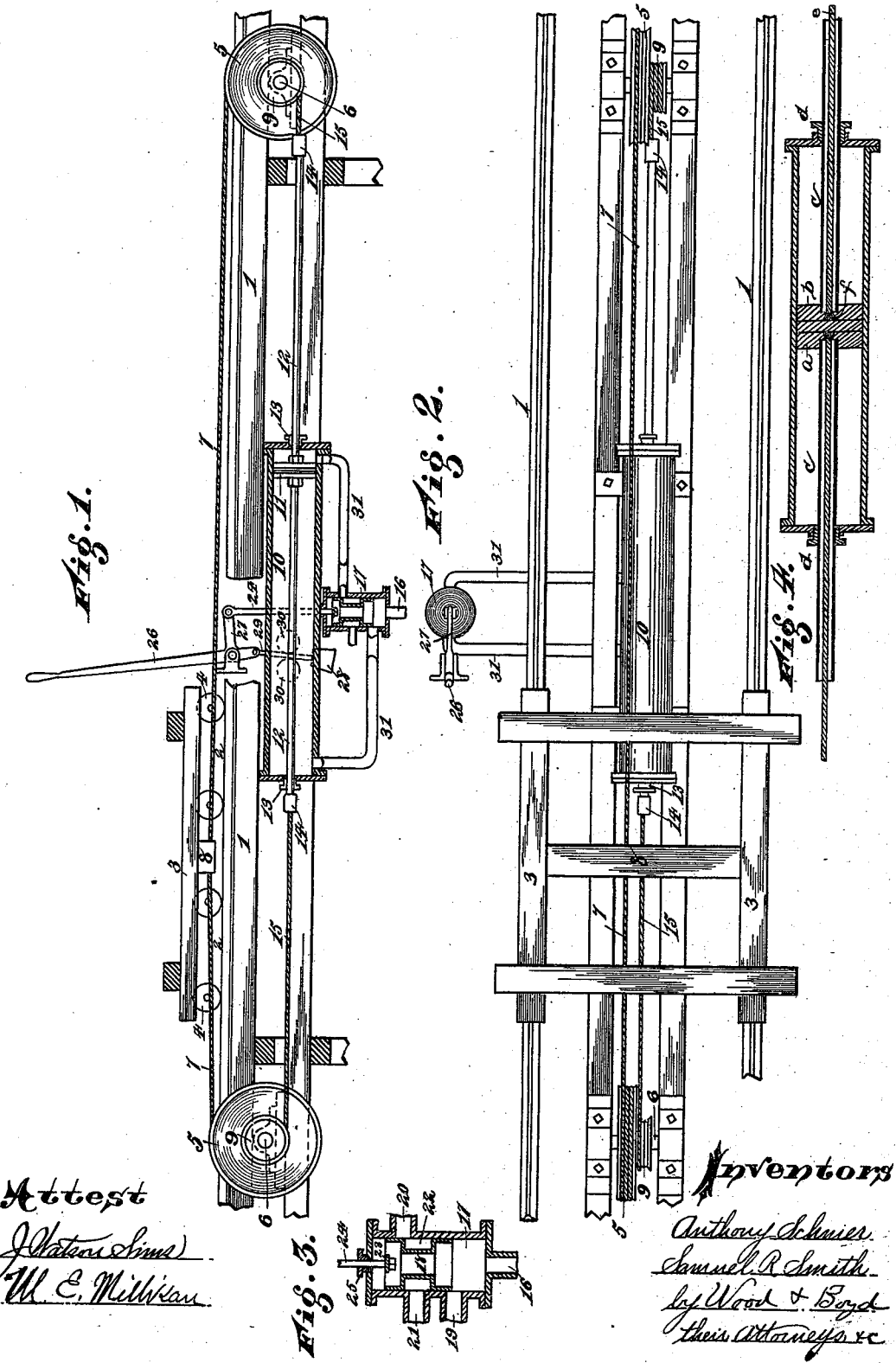

UNITED STATES PATENT OFFICE.

ANTHONY SCHNIER AND SAMUEL R. SMITH, OF CINCINNATI, OHIO, ASSIGNORS TO SMITH, MYERS & SCHNIER, OF SAME PLACE.

FEED MECHANISM FOR SAW-MILL CARRIAGES.

SPECIFICATION forming part of Letters Patent No. 377,469, dated February 7, 1888.

Application filed March 28, 1887. Serial No. 232,686. (No model.)

*To all whom it may concern:*

Be it known that we, ANTHONY SCHNIER and SAMUEL R. SMITH, residents of Cincinnati, in the county of Hamilton and State of Ohio, have invented certain new and useful Improvements in Feed Mechanism for Saw-Mill Carriages, of which the following is a specification.

Our invention relates to a saw-mill feed.

The object of our invention is to produce a cheap, rapid, and effective device by which the carriage carrying the log can be driven rapidly, stopped, started, and reversed instantly with a small expenditure of power and by a simple arrangement of the machinery, all of which will be fully set forth in the description of the accompanying drawings, making a part of this specification, in which—

Figure 1 is a side elevation, partly in section, of our invention in position for use. Fig. 2 is a top plan view of the same. Fig. 3 is an enlarged central sectional view of the valve-chamber. Fig. 4 represents a modification of the method of constructing and attaching the cable to the piston.

1 represents the sills on which the carriage-trucks 2 are mounted.

3 represents the saw-mill carriage.

4 represents the wheels on which the same are mounted and carried.

5 represents multiplying windlass-drums placed at each end of the carriage. 6 represents the axles on which the same are mounted. It is desired to have the upper periphery of the drums nearly on a line with the chains or cables 7, which are preferably attached to the block 8 under the carriage. By making the peripheries nearly on a line with the attaching-point 8 the carriage is driven by power and with small amount of strain upon the parts.

9 represents a secondary driving-drum mounted on the said shaft 6, and rigidly secured to the larger drum, 5.

10 represents a steam-cylinder; 11, a steam-piston to which are attached piston-rods 12, which work in stuffing-boxes 13 at either end of the cylinder.

14 represents coupling for attaching said piston-rods to the cables or chains 15, which are wrapped around the drums 9. The lower peripheries of these drums 9 are on a line with the piston-rods, whereby the direct pull is made from the piston-rods to the driving cables or chains 15. The drums 9 in a peripheral line are, say, one-third the length of the peripheral line of the drums 5. By this means the cylinder 10 will only be one-third the length of the entire travel of the carriage. Thus a carriage which is required to travel thirty feet will only require a ten-foot driving-cylinder. We do not limit our invention to this proportion of the multiplying power of the drums.

16 represents the steam-pipe for delivering the steam to the cylinder 10.

17 represents the valve-chamber, in which is placed a cylindrical shell-valve, 18.

19 represents one of the feeding-ports, and 20 represents the other steam-port; 21, the exhaust-port; 22, a reduction in the size of the shell-valve to allow the steam to be admitted from either port to the exhaust.

Fig. 3 shows the valve in position for the cylinder taking steam through port 19 and exhausting through port 20. 23 represents a bridge connected to the top of the valve 18.

24 represents the valve-stem projecting up through the stuffing-box 25. 26 represents the valve-lever. 27 represents a crank-arm pivoted to the valve-stem 24. As the lever 26 is moved either side of the perpendicular, it cuts off the steam from one end of the cylinder and admits it to the other. 28 represents the weight connected by a cable, 29, to the lower end of the lever 26. 30 represents friction-rollers, between which the rope 29 passes. The object of these devices is to hold the lever perpendicular with the steam cut-off, so that if by accident the lever should be released by the operator the steam would be instantly cut off and the carriage stopped; and it also enables the operator to readily stop the machine without danger of throwing the lever past the center.

31 represents steam-pipes leading from the valve to either end of the steam-cylinder.

By means of this device we are enabled to employ a comparatively short steam-cylinder for driving a saw-mill carriage, and by means of multiplying-drums are enabled to obtain a direct pull upon the piston-rod and saw-mill carriage, respectively.

In the modification, Fig. 4, we have shown the piston-head constructed of two sections, $a$ $b$. $c\ c$ represent gas-pipes, each securely connected to its respective section of piston-head $a\ b$, and passing through the stuffing-boxes $d$. $e$ represents cables passing through the gas-pipes $c$, and securely fastened to the section of the piston-head by a knot, $f$, or other suitable means. The object of employing this form of connection is twofold; first, it lightens the piston-rod, and, second, it allows the cable a lateral travel on the winding-drums 9 without strain on the piston-rod.

Having described our invention, what we claim as new is—

1. In a saw-mill, the combination, with the carriage and the track supporting the same, of a centrally-located cylinder having its piston-rod projecting from both ends, multiplying-drums located at the ends of the track, and each connected by cords with the piston rod and with the carriage, and a central lever controlling the mechanism, substantially as described.

2. The combination, with the carriage and a track on which it moves, of a centrally-located cylinder having a piston-rod which projects both ways from the piston and passes through both ends of the cylinder, multiplying-drums at the ends of the track, each connected with the piston and with the carriage, and a central lever having a weight by which the valve is normally balanced between the ports, substantially as described.

3. The combination, with the carriage, the track, and a centrally-located cylinder, of tubular piston-rods projecting from both sides of the piston and passing through both ends of the cylinder, and cords passing from the drums at the ends of the track through the tubular piston-rods and connected to the piston, substantially as described.

In testimony whereof we have hereunto set our hands.

ANTHONY SCHNIER.
SAMUEL R. SMITH.

Witnesses:
ROBERT ZAHNER,
M. E. MILLIKAN.